United States Patent [19]

Moores et al.

[11] 4,193,828
[45] Mar. 18, 1980

[54] METHOD OF FORMING CARBON COMPOSITES

[75] Inventors: Peter R. Moores, Sanford; James E. Shoffner, Kennebunk, both of

[73] Assignee: Fiber Materials, Inc., Biddeford, Me.

[21] Appl. No.: 914,336

[22] Filed: Jun. 12, 1978

Related U.S. Application Data

[62] Division of Ser. No. 708,929, Jul. 27, 1976, Pat. No. 4,131,708.

[51] Int. Cl.² ............................................. B32B 7/00
[52] U.S. Cl. ................................. 156/148; 102/105; 139/425 R; 244/117 A; 427/228; 428/257; 428/259; 428/408
[58] Field of Search ............... 428/257, 259, 261, 408; 156/148; 427/228, 229; 244/117 A, 163; 423/447, 448; 102/105; 139/11, 425

[56] References Cited

U.S. PATENT DOCUMENTS

| | | | |
|---|---|---|---|
| 3,498,929 | 3/1970 | Accuntius | 428/408 |
| 3,556,922 | 1/1971 | Green et al. | 428/98 |
| 3,672,936 | 6/1972 | Flarenrich et al. | 428/408 |
| 3,749,138 | 7/1973 | Rhegume et al. | 428/408 |
| 3,900,675 | 8/1975 | Alcott | 428/408 |
| 3,904,464 | 9/1975 | King | 156/148 |
| 3,955,602 | 5/1976 | King | 156/148 |
| 3,991,248 | 11/1976 | Bauer | 428/408 |

*Primary Examiner*—Caleb Weston
*Attorney, Agent, or Firm*—Schiller & Pandiscio

[57] ABSTRACT

The ablative response at predetermined locations in a carbon-carbon reinforced composite material are selectively modified by one or more implants of a compatible, non-carbon material disposed at selected sites in the material. The implants of non-carbon material, which should have a melting point below the sublimation temperature of the surrounding carbon matrix and thermal expansibility having a force below the strength of the surrounding carbon matrix, preferably are arranged essentially parallel to one another at selected axial sites in the direction of expected thermal flux.

6 Claims, 5 Drawing Figures

○ – 22 ENDS 0.003 INCH DIA. TANTALUM WIRE

□ – 12 ENDS 0.003 INCH DIA. TANTALUM WIRE, 1 END THORNEL-50

○ – 4 ENDS 0.003 INCH DIA. TANTALUM WIRE, 2 ENDS THORNEL-50

● – 3 ENDS THORNEL-50

METHOD OF FORMING CARBON COMPOSITES

This application is a division of my copending application Ser. No. 708,929 filed July 27, 1976 U.S. Pat. No. 4,131,708 for Selectively Modified Carbon-Carbon Composites.

This invention relates to reinforced carbon or graphite composite materials and more particularly to novel ablative materials of reinforced carbon or graphite composites, and a method of making same.

The manner in which an ablative material absorbs thermal energy is basically due to its ability to dissipate absorbed thermal energy by melting, vaporization and/or sublimation of surface material. Ablative materials are generally employed on articles which are expected to be subjected to large amounts of thermal energy for a relatively short period of time, e.g., rocket nose cones and nozzles, and on reentry vehicle leading edges. By absorbing and dissipating large amounts of thermal heat the ablative material limits the temperature rise of the underlying structural shell and the internal components of the vehicle. While temperature limitation generally is the principal criterion in selecting an ablative material, mechanical performance of the ablative material generally is also an important consideration.

It is generally considered that graphite-fiber reinforced carbon matrix composite materials are good ablative materials as possessing relatively high heat of ablation, relatively high thermal conductivity, and good mechanical strength. On the other hand, thermal protection systems such as rocket nose cones and nozzle components, and heat shields for other applications formed from such known carbon-carbon reinforced ablative materials occasionally undergo shape change under high temperature and pressure conditions. Such shape change is believed to result from uneven thermal stress and mechanical forces at various surface locations on the thermal protection system and the behavior of the composite constituent materials at such locations under high temperature and pressure conditions.

A primary object of the present invention is to provide a novel and efficient ablative material. Another object of the present invention is to provide an ablative material which also has good mechanical strength. Still another object of the present invention is to provide a thermal protection system which is characterized by a substantially uniform rate of erosion across the surface. Yet other objects of the present invention will in part appear obvious and will in part appear hereinafter.

The invention accordingly comprises the processes and the several steps and the relation of one or more of such steps with respect to each of the others, and the products possessing the features, properties and relation of elements which are exemplified in the following detailed disclosure and the scope of the invention all of which will be indicated in the claims.

Generally, to affect the foregoing and other objects the present invention provides a carbon-carbon reinforced composite material having one or more implants of a compatible, non-carbon material disposed at selected sites in the material. The non-carbon implants are formed of materials which have (a) a melting point or sublimation temperature below the sublimation temperature of the surrounding carbon matrix, and (b) a thermal expansibility having a force which is below the strength of the surrounding carbon matrix. The non-carbon implants preferably are arranged in columns essentially parallel to one another at selected sites in the direction of expected thermal flux.

For a fuller understanding of the nature and objects of the present invention, reference should be had to the following detailed description taken in connection with the accompanying drawings, wherein.

Figure 1:
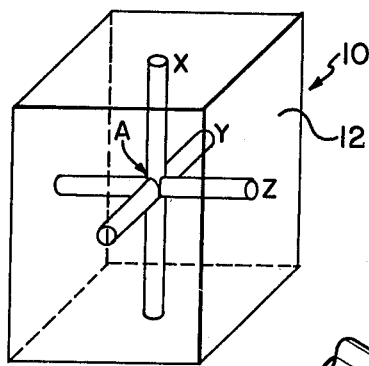
FIG. 1 is a perspective view of a geometric representation of a unit cell of ablative material of the prior art.

Any suitable binder which will carbonize when heated at elevated temperatures may be utilized in forming the carbon matrix of the composite materials of the present invention. For example, binders such as phenolic condensation products, urea condensation products, epoxy resin, dextrose and petroleum pitch may be used. Preferred as a binder material is petroleum pitch.

Carbon based woven fibers are generally perferred as the carbon reinforcements of the present invention. However, it is intended that the term "carbon reinforcements" should include both graphite and non-graphite carbon fibers as well as monolithic graphite and non-graphite carbon. In preferred form, the carbon reinforcements comprise a multi-dimensional network of carbon fiber material in a carbonized form, e.g., as carbon or graphite yarn, arranged in a plurality of groups, each group comprising a plurality of yarns arranged parallel to one another.

The implants are chosen primarily for their thermal characteristics. Thus, for the purposes of the invention the implants should be formed of a material which has a melting point (or sublimation temperature) below the sublimation temperature of the surrounding carbon matrix.

The non-carbon implants should be substantially unreactive with carbon at high temperature, i.e., under graphitization and ablative conditions. However, materials which react with carbon at high temperature may be employed in accordance with the present invention provided the reaction product with carbon, e.g., the corresponding carbide, possesses the aforesaid melting point property. Moreover, the thermal expansibility of the implants should be limited to provide a force less than the strength of the surrounding carbon matrix so that the resulting composite material will not fracture when heated to high temperature. Such materials are considered to be "compatible non-carbon material" for the purpose of this invention.

While the non-carbon implants may also contribute to the structural strength of the matrix, the non-carbon implants are not particularly chosen for their yield strength which may be substantially lower than corresponding reinforcements of carbon.

A number of materials satisfy the aforesaid criteria and may be used for forming the non-carbon implants of the present invention. Preferred are carbide-forming metals such as tantalum, tungsten, titanium, rhenium and the like and carbides thereof, as well as silicon carbide and metals which do not form carbides generally.

Preferably, the non-carbon implants are carbides which are formed in situ from a precursor simultaneously with the carbonization of the binder.

In one embodiment of the invention the carbon reinforcement may be in the form of a mat of carbon fibers, in which case the non-carbon implants (which may be fiber or yarn form, or in the form of wire rod or the like) may simply be implanted into the carbon-reinforcement skeleton prior to impregnation and graphitization, e.g., as by weaving the yarns of wires of non-carbon material into the carbon fiber mat.

In another embodiment of the invention, the carbon reinforcement skeleton may comprise a monolithic carbon body, e.g., a carbon block. In such case the carbon block may be drilled, and the drilled holes back-filled with the non-carbon material prior to impregnation and graphitization. Alternatively, the carbon reinforcement skeleton may first be infiltrated with a binder, and the binder hardened to form a solid composite billet. Holes may then be drilled in the billet, and the drilled holes back-filled with the selected non-carbon material, e.g., as in the form of a powder metal or a rod. The resulting billet is then subjected to pressure impregnation-carbonization and graphitization in repeated sequence to final density in accordance with techniques well known in the art.

Referring to the drawings wherein like characters refer to like parts, FIG. 1 shows a geometrical representation of a ablative composite material of the type well known in the prior art. The composite body preform 10, only a unit cell of which is shown, consists of three groups of graphite reinforcing yarns which are interwoven. The yarns of each group are woven essentially in the same direction with respect to one another and in a direction which is mutually orthogonal with respect to the direction of the yarns of the other two groups. The three mutually orthogonal directions of the groups of yarns can be represented by a three-dimensional Cartesian Coordinate System having X, Y, and Z axes intersecting at a point A. As shown in FIG. 1, the three axes are oriented to be either parallel with or normal to the faces of perform 10 inasmuch as in most instances the greatest average mechanical reinforcement can be achieved by such orientation to the directions of the three groups of yarns. The yarns are incorporated into a carbonized matrix material 12.

The actual composite material is formed in known manner into a thermal protection system of desired size and shape from a plurality of unit cells 10 such as shown. The thermal protection system may have any geometric form such as block, cylindrical, plate, frusta and the like, and may be self-supporting and designed to withstand one or a combination of compression, tension and bending forces in addition to high temperature.

As mentioned above, thermal protection systems formed in accordance with the prior art occasionally may undergo uneven shape change or irregular erosion when subjected to high temperature and pressure conditions. The rate of shape change is believed to be a function of the initial shape, the direction of heat flux and pressure and concentration of heat and pressure at various surface locations, and the behavior of the particular ablative material at the surface locations under such high temperature and pressure conditions. Moreover, it has been found that erosion irregularities experienced with prior art ablative materials may become more pronounced as the exposure to high temperature and pressure is continued.

The present invention provides an ablative material in which the erosion resistance at high temperature and pressure may be tailored, i.e., so as to provide a thermal protection system which is characterized by substantially uniform rate of erosion across the surface of the shield under continued exposure to high temperature and pressure.

Figure 3:
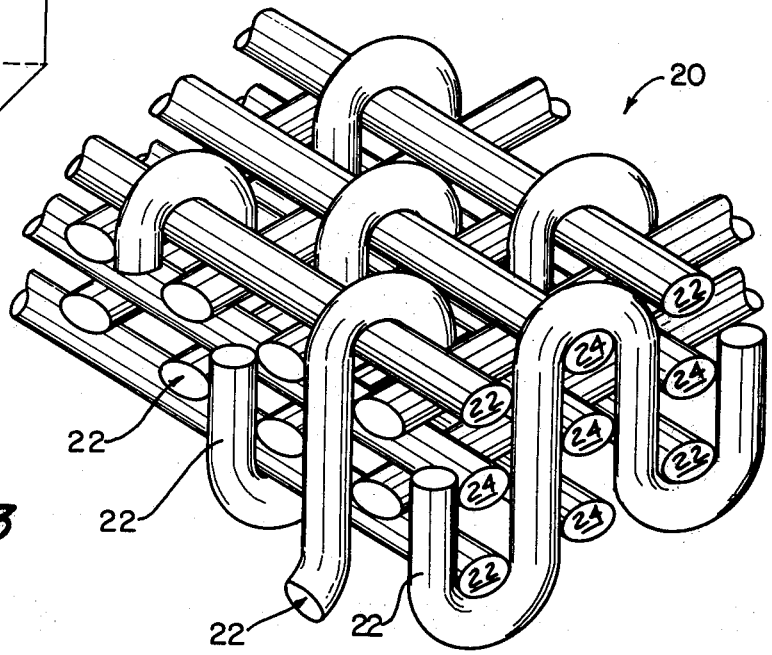
FIG. 3 is a perspective view of a geometric representation of one embodiment of ablative material made in accordance with the teachings of the present invention.

A geometrical representation of a preferred embodiment of the improved composite material of the present invention is shown in FIG. 3. The composite body 20 includes three groups of graphite yarns which are interwoven together in the same manner as the prior art three dimensional preform described in FIG. 1, in mutually orthogonal directions, each axis being normal to a face of the preform.

However, as distinguished from the prior art composite material, columns of a non-carbon material as above described have been implanted into the body in place of some of the graphite reinforcing yarns. The composite body preform cell 20 is shown with the X, Y, and Z axis in which a number of the graphite fibers 22 along the Z axis are substituted by columns 24 of non-carbon material.

The volume proportion occupied by the non-carbon implants of the composite reinforced body, and also the locations of the non-carbon implants in the body will depend upon the particular shape of the composite body, the anticipated heat and pressure conditions at various surface locations on the body, type of non-carbon implants, and the behavior of the composite constituent materials at these locations at the various heat and pressure conditions. As a general rule the composite body will comprise between about 5 and 25 volume percent of non-carbon implants. The latter are preferably arranged in elongated columns essentially parallel to one another at selected sites in the direction of expected thermal flux. The non-carbon implants are found to change certain of the physical properties of the carbon-carbon composite adjacent the area of implantation. For one, the volume of the material at the implants has a lower melting point than the remaining areas of the composite. The tensile strength of the material proximate the non-carbon columns generally is also changed.

The following Table together with FIG. 3 is an example of how a graphite fiber reinforced carbon matrix composite material may be modified by implanting tantalum wire at selected sites in the material in accordance with the invention:

TABLE I

| Graphite yarn sites per square inch of reinforcement direction surface | | | Non-graphite yarn sites per square inch of reinforcement direction surface | | |
|---|---|---|---|---|---|
| X | Y | Z | X | Y | Z |
| Original Composite (FIG. 1) 990 | 990 | 1089 | 0 | 0 | 0 |
| Modified Composite (FIG. 3) 990 | 990 | 920 | 0 | 0 | 169 |

It should be noted that the modified composite is not as strong as the original composite in the Z direction due to the replacement of some of the high tensile strength graphite fibers, by lower tensile strength tantalum wire. However, reduction of mechanical strength in the Z direction may also contribute to the ability of the modified composite of the present invention to maintain a substantially uniform erosion shape under high temperature and pressure conditions.

In practice, the material may be impregnated with binder prior to shaping, following shaping, or the composite material may be partially impregnated prior to shaping, and impregnation completed following shaping. The order of shaping and impregnating is not particularly important in the instant invention. Preferably the material is impregnated with binder under pressure, and the material is heated under pressure to carbonize the binder.

The manner and conditions under which the binder is carbonized are conventional in the art and are not critical to the practice of the present invention.

The following examples illustrate more clearly the manner in which carbon-carbon reinforced composite materials may be provided and used according to the invention. The invention, however, should not be construed as limited to the particular embodiments set forth in the examples which are given as merely exemplary.

EXAMPLE I (Prior Art)

Graphite yarn of approximately 0.010 inches diameter and 315,000 psi tensile strength, containing approximately 1440 individual fibers of $50 \times 10^6$ psi modulus (available from Union Carbide Corporation under the trade name "Thornel-50") is 3-D woven into a block with dimensions $X=4''$, $Y=4''$, and $Z=8''$. The Z yarns are located perpendicular to the X, Y plane with three strands of Thornel-50 in each site, each site being spaced on 0.030 inch centers in a square array. The X and Y yarns (two strands of Thornel-50 in each site) are spaced 0.30 inches apart across the Z yarns and 0.033 inches along the Z yarns.

The woven block is placed in an impregnator, the impregnator is evacuated to a pressure of about 28 inches of mercury, and the woven block is then impregnated with a petroleum pitch "240" (available from Ashland Company).

The resulting woven block is heated to a temperature of 650° C. over about a 19 hour period. Pressure on the woven block is maintained at about 10,000 psi during the heating period. Pressure impregnation and heating under pressure are repeated in sequence for 6 times.

The heated block is then allowed to cool. A 4 by 4 by 8 inch graphite fiber reinforced carbon composite having a density of about 1.89 g/cc results.

Figure 2:
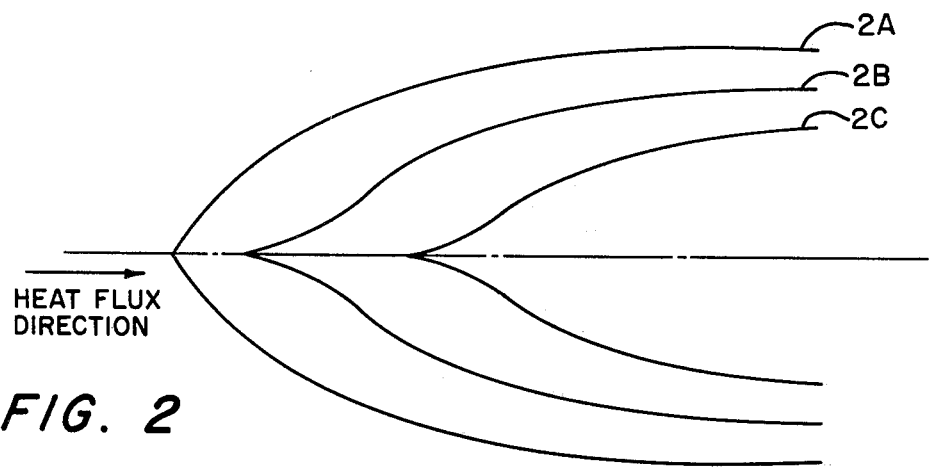
FIG. 2 is a plot showing erosion profiles of a shaped article formed of a prior art ablative material as shown in FIG. 1, under a substantially unidirectional heat flux for various amounts of time.

The resulting reinforced composite is machined to a shape of a rocket nose tip as shown in curve 2A, and the shaped body is subjected to high heat flux conditions (in the Z axial direction) to determine the erosion characteristics of the material. The erosion characteristics of the material as produced according to this example are shown over time in FIG. 2 from the starting time (curve 2A), and after 2 and 6 second intervals (curves 2B and 2C). It is noted that the nose tip formed of carbon-carbon reinforced composite material in accordance with this prior art example erodes irregularly, with the effect being more pronounced as heating continues.

EXAMPLE II

Figure 4:
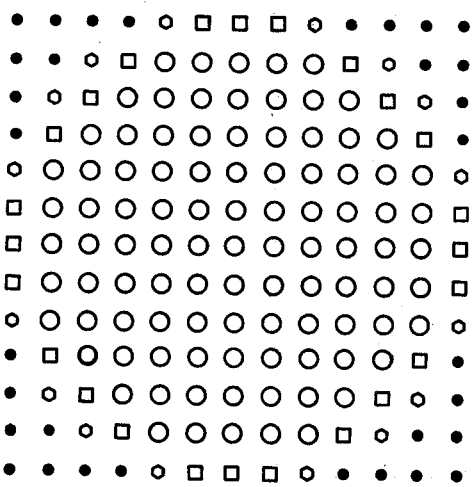
FIG. 4 is an enlarged cross-sectional view of the ablative material of FIG. 3 taken along line 4—4.

The process of Example I is repeated with the following difference: The area proximate the center of the $4'' \times 4''$ X, Y plane was modified by substituting for some of the Thornel-50 yarns in the woven block, 0.003 inch diameter stranded titanium wire as shown in FIG. 4. Impregnation and graphitization is as in Example I.

Figure 5:
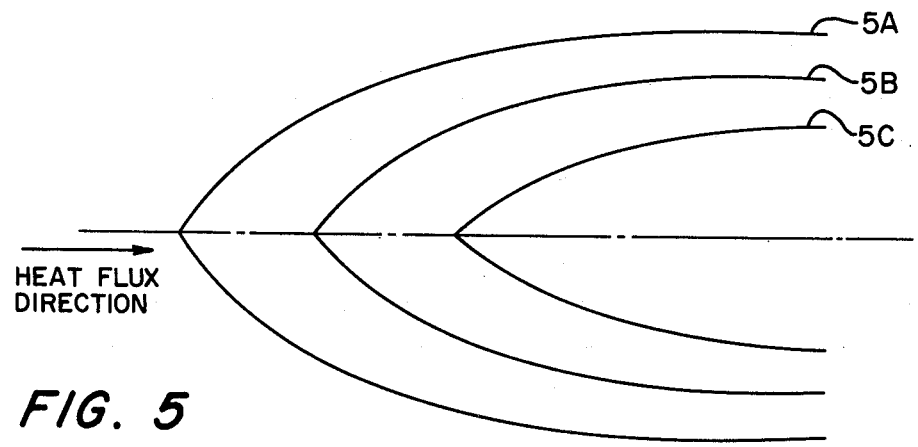
FIG. 5 is a plot showing erosion profiles of a shaped article formed of ablative material in accordance with the present invention, under a substantially unidirection heat flux for various amounts of time.

The resulting composite is machined as in Example I to a shape as shown in curve 5A, and the resulting material is subjected to high heat flux conditions (in the Z axial direction) as in Example I. The erosion characteristics of the modified composite material as produced in accordance with this example is shown in FIG. 5 (curves 5A–5C).

It is noted that the thermal protection system formed of the carbon-carbon composite material containing titanium wire implants in accordance with the present example erodes substantially uniformly over time.

Certain changes may be made in the above process and materials without departing from the scope of the invention herein involved. For example, the implants may comprise a plurality of short segments of non-carbon material arranged in layers throughout selected areas in the composite. Still other changes will be obvious to one skilled in the art.

What is claimed is:

1. A method of forming a carbon-composite, comprising the steps of:
   providing a carbon fiber body,
   implanting columns of refractory metal at selected positions within said body,
   impregnating said body with a carbonizable binder material, and
   heating the impregnated body under pressure so as to (1) carbonize said binder and (2) simultaneously convert said metal in situ to refractory metal carbides having (a) a melting point below the sublimation temperature of the surrounding composite and (b) a thermal expansibility having a force below the strength of the surrounding composite.

2. A method in accordance with claim 1 wherein said body is impregnated with said binder prior to implanting said columns of refractory metal, and said implanting step includes
   drilling holes in said impregnated body so as to accommodate said, refractory metal and
   back-filling said holes with said refractory metal.

3. A method in accordance with claim 1 wherein said body comprises an array of carbon filbers and said columns are in the form of metal wires, including the step of weaving said columns into said array.

4. A method in accordance with claim 1 wherein said refractory metal is selected from the group consisting of tantalum, tungsten, titanium, rhenium, and silicon.

5. A method in accordance with claim 1 including the step of substantially aligning said columns essentially parallel to one another in said body.

6. A method according to claim 1 wherein said columns comprise between about 5 and 25 volume percent of said carbon-composite.

* * * * *